3,200,047
METHOD OF REMOVING DUST FROM
REACTIVE SOLID PARTICLES
Bruce E. Kurtz, Solvay, N.Y., assignor to Allied Chemical Corporation, New York, N.Y., a corporation of New York
Filed May 17, 1962, Ser. No. 195,537
4 Claims. (Cl. 202—31)

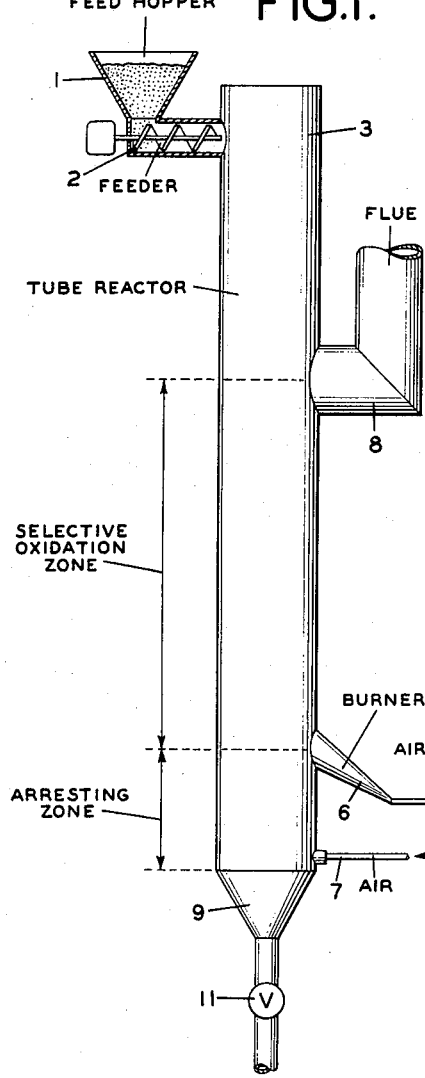
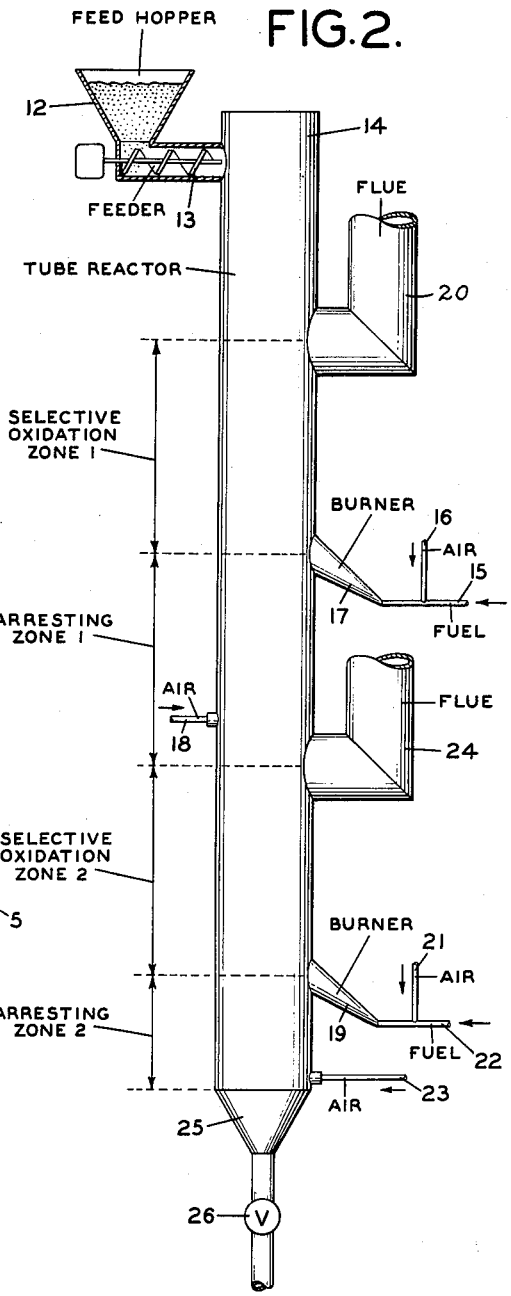

This invention relates to the treatment of a mixture of particles of an uneven size and more particularly refers to a new and improved method for removing dust from combustible particles containing the same.

Finely divided combustible particles such as crushed or ground coke are employed as a component in the operation of fluidized solids bed reactors in which the products of the reaction are removed as vapors to an external condenser. The entrainment of solids i.e. dust from the bed represents a serious source of contamination. It is possible to adjust the size of the fluidized particles and the velocity through the bed so as to eliminate blowover of larger particles, but the dust normally adhering to the particles will be carried off in the gas stream. This problem is particularly important in fluid bed chlorinations of metal oxides in which coke particles are employed as a reactant to produce volatile metal chlorides which are readily condensable as solids, as there is no effective way of separating the metal chloride product from the blowover coke dust.

An object of the present invention is to provide an efficient economical method of separating dust from fine particles of combustible material containing the same. Another object of the present invention is to provide a method of separating coke dust from larger finely divided particles of coke containing the same without substantial deterioration of the larger particles. A further object is to provide a non-mechanical method of separating dust from larger particles of combustible material containing the same. Other objects and advantages of the present invention will be apparent from the following description and accompanying drawings.

Coke particles of the desired size have use in industry as for example a reactant in a fluidized bed operation and are generally obtained by grinding or crushing large pieces of coke and then subjecting the ground coke to screening to separate coke particles of the desired size. Because of the inherent inefficiency of screening devices the resultant coke particles invariably contain appreciable amounts of fines or coke dust—at least 5 percent of the coke particles are of undesired fineness and more generally 10–15 or more percent of the mixture constitutes particles of undesired size. Other mechanical devices such as ellutriation equipment are not more effective and the violent particulate movement encountered in ellutriation equipment generates dust almost as fast as it is blown out thus resulting in not only a contaminated product but in deterioration of the desired particles.

The present invention is directed to separating the dust from the larger particles by non-mechanical means, i.e., by chemical reaction. Coke particles of different size have a different surface to mass ratio with the fine dust particles having a high surface to mass ratio and the larger coke particles having a relatively low surface to mass ratio. Merely as illustrative a particle of coke dust of 75 micron size has an approximate surface to mass ratio of 50 cm.$^2$/gm., whereas a larger coke particle of 300 micron size has a surface to mass ratio of approximately 12 cm.$^2$/gm., or stated another way the surface to mass ratio of the fine dust particle is 316 percent greater than the surface to mass ratio of the larger coke particle. Difference in surface to mass ratio of particles reflects itself in the rate at which the particle reaches its kindling temperature, i.e.—the temperature at which oxidation is sufficiently rapid to be self-sustaining. Thus, if a large and a small particle of combustible material are exposed to an environment of temperature greater than the kindling temperature of the substance constituting the particles, the small particle will reach the kindling temperature more rapidly than the large particle.

To illustrate, if a 75 micron particle of coke, initially at room temperature, which has a kindling temperature of 600° C. is contacted with a gas at a temperature of 1200° C., its temperature will rise to the kindling temperature in about 0.03 second. On the other hand, a 300 micron particle of coke, initially at room temperature and exposed to the same environment will require about 0.12 second to reach the kindling temperature of 600° C. In general, it may be shown by straight-forward calculation that the time required to raise a particle to its kindling temperature, when exposed to an environment of certain temperature higher than the kindling temperature, is approximately directly proportional to the diameter of the particle. Further the time required to raise a particle of certain diameter to its kindling temperature decreases with increasing temperature of the environment in such a way as to lead to the following approximate relationship between time required to reach kindling temperature, particle diameter and environmental temperature.

$$\Theta \cong KD \log \frac{(t_a - t_b)}{(t_a - t)}$$

Where:
$\Theta$ = Time required to reach kindling temperature.
$D$ = Particle diameter.
$t_a$ = Environmental temperature.
$t_b$ = Initial particle temperature.
$t$ = Kindling temperature.
$K$ = A constant the value of which depends on the physical properties of the particle and the co-efficient of heat transfer between the environment and the particle.

Thus, it may be seen that by regulating the time during which a collection of particles is exposed to an environment of a certain temperature, or by regulating the temperature of an environment to which particles are exposed for a certain time, or by regulating both time and temperature, it is possible to fix some critical particle size such that particles smaller than that size will be raised to the kindling temperature while particles larger than that size will not be raised to the kindling temperature. This difference in the unsteady-state heat transfer properties of particles of varying size is utilized in the process of the present invention to effect chemical separation of the fine dust from the larger coke particles. If the high-temperature environment to which the collection of particles is exposed is oxidizing in nature, the particles which are raised to their kindling temperature will be consumed and converted to gaseous products.

In accordance with the present invention dust removal from larger particles of combustible material containing the same can be effectively accomplished by passing a combustible mixture of particles containing the dust in dispersed form through a selective oxidation zone in contact with an oxygen containing gas, maintaining the temperature in the selective oxidation zone such that the time during which the mixture of particles is exposed to the high-temperature zone is sufficient to raise the temperature of the smaller undesired particles to or above their kindling point to effect oxidation of the smaller particles and conversion to gaseous products, but not sufficient to raise the temperature of the larger particles to their kindling point, releasing the gaseous products, and discharging the larger particles from the selective oxidation zone. If adequate dust removal is not attained in passing through a single selective oxidation zone, the coke particles may be passed through succeeding selective oxidation zones. In this manner substantially complete dust removal from coke particles has been accomplished by the process of the present invention. Neither conventional screening or ellutriation are successful in attaining this degree of dust removal.

FIGURE 1 diagrammatically illustrates a single pass operation for removing dust from particles of combustible material containing the same.

FIGURE 2 diagrammatically illustrates a multiple pass operation for removing dust from particles of combustible material containing the same.

Referring to FIGURE 1, the charging material is finely divided particles of combustible material admixed with finer particles of combustible material which is introduced into feed hopper 1. The operation although described with particular reference to the treatment of coke is also applicable to other substances which are susceptible to oxidation. Thus, the process could be used for removing dust from briquetted sulfur. A typical charge to the process would be coke particles containing predominantly, about 80–90 or more percent particles of the desired size with the remainder consisting primarily of finer particles of coke including a substantial proportion of about 1–5 percent of very fine coke dust. Generally for use in fluid bed reactors the coke particles are of 1500 to 300 micron size and the amount of finer particles should for best operation total less than 5 percent with very fine coke dust, i.e., particles of less than 150 micron size below 0.25 percent, preferably below 1/10 of 1 percent. The dust-coke charge is introduced in a steady stream by a mechanical feeder 2 such as a screw conveyor into the top of a vertical tube 3 which may be insulated to prevent loss of heat by radiation. The coke charge falls by gravity through the vacant space in the tube being dispersed in its drop downwardly more or less uniformly over the cross-section of tube 3. As the coke continues its fall through the tube it enters the zone of selective oxidation wherein the coke particles come in contact with an uprising stream of an oxygen containing gas. It is important to maintain conditions in the selective oxidation zone to effect oxidation of the finer particles of coke, particularly coke dust, without causing any material oxidation of the larger particles of the desired size. Such conditions may be obtained by the introduction of air entering through line 4 and fuel such as a hydrocarbon gas, e.g., methane entering through line 5 and the mixture burned in burner 6 with the hot combustion gases resulting from burning fuel 5 with air 4 passing upwardly through selective oxidation zone in tube 3 in direct contact with the coke dropping down therethrough to impart sufficient heat to raise the finer particles to their kindling temperature but not sufficient to raise the temperature of the larger particles of desired size to their kindling temperature. Oxygen required for oxidizing the coke dust is introduced through line 7 at a point below the burner. It is advantageous to introduce the air for oxidizing at a point below the burner to provide an arresting zone to terminate continuation of the oxidation reaction. There is a tendency for oxidation to continue beyond the selective oxidation zone particularly upon long exposure and bringing of the particles in close proximity to one another as in the collecting zone, with deterioration and oxidation of particles of desired size unless the reaction is arrested. The introduction of cooler air at a point well below burner 6 provides an arresting zone in tube 3 wherein the coke particles leaving the selective oxidation zone are dropped materially in temperature by direct contact with the cooler air thereby precluding possibility of deterioration of the particles of desired size. The products of combustion including the gases formed by oxidation of the coke dust are discharged through flue 8. For thermal efficiency air 4 and fuel 5 may be preheated by passing them in indirect heat exchange with the hot products of combustion released through flue 8. Since considerable heat is generated by the oxidation of the coke dust, the fuel requirements are modest and the operation is highly efficient. The coke particles from which coke dust has been removed by oxidation collect in cone 9 of chamber 3 and are discharged through valve 11.

The kindling temperature of the coke particles will vary depending upon the characteristics of the coke, e.g., the volatile content. The lower the volatile content of the coke the higher the kindling temperature and conversely the higher the volatile content of the coke the lower the kindling point. In any given batch of crushed coke the volatile content of the large and small particles is about the same since they are derived from the same source. As an illustration of the method of determining proper operating conditions consider a coke mixture containing predominantly particles of 300 micron size or larger and a minor amount of finer particles of approximately 75 micron size. As a first step in the calculation of the proper operating conditions to eliminate these finer particles the velocity of fall of the 300 micron and the 75 micron particles is determined. Such determination may be made experimentally but can usually be approximated with sufficient accuracy by calculation. Such calculation for the illustrative case predicts a velocity of fall of 6 ft./sec. for the 300 micron particles and 0.9 ft./sec. for the 75 micron particles. If the length of the selective oxidation zone is for example, two feet and neglecting the retarding effect of the combustion gases, the residence time of the 300 micron particles in the selective oxidation zone will be 0.33 second, while the residence time of the 75 micron particles will be 2.2 seconds. In general, the magnitude of the velocity at which the combustion gases flow upward is small compared to the magnitude of the downward velocity at which the particles fall. Thus, it has been found that combustion gas velocities of 0.05 to 0.5 foot per second could be attained depending on the gas and air rates utilized.

It will be noted that the tendency of the smaller particles to fall more slowly than the larger particles results in the residence time of the smaller particles in the selective oxidation zone being greater than the residence time of the larger particles. Further, because of the upward flow of combustion gases particles finer than those having a terminal velocity equal to the upward velocity of the combustion gases will be carried upward and not enter the selective oxidation zone. Thus, if the upward velocity of the combustion gases is 0.1 foot/second, particles smaller than 20 microns will be entrained upward and leave with the combustion gases. The result of these influences is to augment the effects resulting from the unsteady-state heat transfer properties of the particles and to further improve the removal of the undesired finer particles. It should not be inferred, however, that this apparatus operates on a principle of ellutriation or hindered settling. These effects are secondary to the effects resulting from unsteady-state heat transfer to the particles.

Returning to the illustrative case under consideraion, it is desired to fix a temperature for the selective oxidation zone such that the residence time of 0.33 second for the larger particles is not sufficient to raise these particles to their kindling temperature. By using the relationship presented previously it is possible to calculate the proper value for the temperature. Such a calculation results in a figure of 1020° C. This represents the maximum temperature which can be tolerated in the selective oxidation zone without consumption of the 300 micron and larger particles. A similar calculation for the 75 micron particles shows that a temperature less than one degree above the kindling temperature needs to be maintained in the selective oxidizing zone to consume only the 75 micron and smaller particles. In general, it is noted that when dealing with very small particles, say less than 100 microns, it is difficult to obtain selective oxidation, say between 100 micron and 50 micron particles because the temperature of the selective oxidizing zone must be held within less than one degree above the kindling temperature or because the length of the selective oxidizing zone must be very short. On the other hand when dealing with larger particles, say 300 microns, it is relatively easy to obtain selective oxidation, as the temperature can be maintained well above the kindling temperature, say 300 to 500° C. above, so that minor fluctuations in temperature will not grossly affect the selective oxidation and so that the length of the selective oxidation zone is reasonable, say more than one foot.

Thus, from a knowledge of the kindling temperature and other physical properties of the coke, the length of the selective oxidation zone and the falling velocity of the coke it is possible to calculate a temperature for the selective oxidation zone which will result in consumption of all coke particles below a certain size. This temperature may then be obtained by proper adjustment of the air and gas rates.

The temperature in the selective oxidation zone may also be obtained by initiating the operation and analyzing samples of the product produced during the start of the operation to determine whether effective removal of coke dust has been accomplished or whether oxidation of the larger particles has taken place and then by varying the amount of fuel for combustion, increasing or lowering the temperature in the selective oxidation zone until the proper temperature is arrived therein to produce a product which effectively removes the coke dust without deterioration of the coke particles of desired size. The amount of air introduced near the bottom of tube 3 will vary dependent on the amount of coke dust present and can be determined by calculation or simply by varying the quantity of air during oxidation until effective oxidation of the coke dust is accomplished. Excess air may be employed but usually an amount of excess air above 20 percent is unnecessary.

FIGURE 2 illustrates an operation wherein selective oxidation is accomplished in a plurality of zones. Referring to FIGURE 2, the charge material such as coke particles containing coke dust are introduced into a feed hopper 12 and then conveyed by feeder 13 into the top of tube reactor 14 wherein the particles are dropped downwardly by force of gravity toward the bottom of the tube. Fuel entering through line 15 and air through line 16 are burned in burner 17 and the resultant combustion gases enter selective oxidation zone 1 at a temperature and in an amount sufficient to raise the temperature of the dust particles to the kindling temperature but not sufficient to raise the particles of larger size to the kindling temperature. Air entering through line 18 is the source of oxygen which causes the coke dust particles in the selective oxidation zone 1 to burn to gaseous combustion products. The gaseous products after passing through selective oxidation zone 1 are discharged through flue 20. The air entering line 18 also serves another function namely to cool the coke particles and prevent deterioration and combustion of particles of the desired size. This cooling area is designated as arresting zone 1.

The coke particles from which finer particles have not been completely removed then drop down into selective oxidation zone 2 wherein they come in contact with hot combustion gases generated in burner 19 which result from the combustion of air entering through line 21 and fuel entering through line 22. The hot combustion gases from burner 19 elevate the finer particles to the kindling temperature but do not raise the larger particles of desired size to the kindling temperature. Air entering through line 23 furnishes the oxygen for combustion of the finer particles in selective oxidation zone 2. The products of combustion leaving selective oxidation zone 2 discharge through flue 24. Also as a result of cool air entering through line 23 there is provided an arresting zone 2 wherein the temperature of the particles is dropped to below their kindling temperature. The resultant coke particles substantially free of coke dust are collected in cone 25 of tube reactor 14 and then discharged through valve 26 to storage. Dependent on the amount of coke dust in the coke particle charge and the degree of coke dust removal desired, either one, two or three or more selective oxidation zones may be employed. In practice we have found one or two selective oxidation zones will generally be adequate for effective dust removal from coke particles.

The following example illustrates the present invention.

The feed stock was a coke which had previously been screened and which contained 90 percent by weight of particles of the desired size having a mesh size of 10 to 40; 1 percent of slightly oversized particles having a mesh size of 4 to 10; 8 percent of finer particles having a mesh size of 40 to 100; and 1 percent of very fine dust particles which were finer than 100 mesh and an average of about 75 micron size. It should be noted that the particles which are slightly smaller than the particles of desired size do not cause too much difficulty in subsequent reaction in a fluidized bed but it was found that the fine dust particles were the most troublesome cause of contamination in a fluid bed reactor. Consequently it is most important to remove the dust particles from the coke feed stock.

The apparatus employed was as illustrated in FIGURE 1 and consisted of a tube 8 feet in height with the flue disposed about 2 feet from the top of the tube and the burner about 5 feet from the top of the tube and the air inlet about 7 feet from the top of the tube thus providing a selective oxidation zone of about 3 feet in height and an arresting zone about 2 feet in height. The tube which was 6 inches in diameter also had a conical bottom for collection of the desired product. Into the top of the tube was fed the coke feed stock which dropped down in dispersed condition in to the selective oxidation zone wherein it came in contact with hot combustion gases generated by burning natural gas with air. Air for oxidation was also introduced into the bottom of the arresting zone and passed upwardly into the selective oxidation zone. Ten to twenty s.c.f.h. of natural gas were burned and the supplemental air rate set at five to ten times the gas rate. The coke particles after passing through the selective oxidation zone and arresting zone were collected in the conical bottom of the tube, discharged therefrom and analyzed for coke dust. Adjustments were made at the initiation of the operation with burner gas and the air supply until the product discharged from the bottom of the cone showed substantial removal of the coke dust without deterioration of the desired coke particles and the operation was continued under these conditions. Analysis of the product showed 94 percent by weight of particles of the desired size having a mesh size of 10 to 40; 1 percent of slightly oversized particles having a mesh size of 4 to 10; 5 percent of finer particles having a mesh size of 40 to 100; and 0.015 percent of very fine dust particles which were finer than 100 mesh and generally about 75 micron size. Thus, approximately 98 percent of the coke dust was removed from the feed stock without material loss or deterioration of the desired particles of coke.

For purposes of determining the practical effect of the use of coke freed of dust produced in accordance with the present invention when employed as a reactant in a fluidized bed operation, two tests were carried out.

Chromic chloride was produced by chlorination in a fluid bed which was fed a mixture of coke and chromic oxide in a ratio of two to one by weight. Chlorine was introduced into the bottom of the bed together with sufficient oxygen to maintain the temperature by combustion of a portion of the coke. Excess coke was purged more or less continuously from the bed in an amount equal to about half of that fed.

Operation for a five day period with coke "as received"

during which 400 pounds of chromic chloride were produced yielded product containing on the average of 4.2% carbon. These operating conditions were then maintained for another five day period, using coke which had been treated as described herein, during which 400 pounds of chromic chloride averaging 1.6% carbon were produced. Thus, a 62% reduction in carbon contamination was accomplished.

The process of the present invention offers distinct advantages over conventional techniques of dust removal, such as screening or ellutriation. The required apparatus is extremely simple, of low initial cost and virtually maintenance free in operation. By contrast, mechanical size separation equipment is notoriously complex, relatively high in initial cost and high in maintenance requirements.

Although certain preferred embodiments of the invention have been disclosed for purpose of illustration, it will be evident that various changes and modifications may be made therein without departing from the scope and spirit of the invention.

I claim:

1. A method for the removal of fine particles from larger particles of combustible material containing the same which comprises introducing said mixture of combustible particles into the top of a vertical elongated reaction zone, passing said mixture in dispersed form downwardly by force of gravity through the vertical elongated reaction zone, introducing hot combustion gases into said vertical elongated reaction zone in direct contact with and countercurrent to the particles of combustible material dropping down through the vertical elongated reaction zone to raise the temperature of the finer particles to the kindling temperature but maintain the temperature of the larger particles of combustible material below the kindling temperature, introducing oxygen into said vertical elongated reaction zone countercurrent to and in direct contact with the particles to effect selective oxidation of the finer particles at their kindling temperature to convert the finer products into gaseous products without causing any material oxidation of the larger particles, discharging the combustion gases and the gaseous products from the vertical elongated reaction zone, introducing said oxygen into said vertical elongated reaction zone at a point below the introduction of said hot combustion gases to cool the particles of combustible material after being subjected to selective oxidation, and discharging the cooled combustible particles from the vertical elongated reaction zone.

2. A process as claimed in claim 1 wherein the combustion gases are generated by burning a fluid hydrocarbon with air and air is employed as the source of oxygen gas for cooling and for providing oxygen for selective oxidation of the finer particles.

3. A process as claimed in claim 1 wherein selective oxidation in the vertical elongated reaction zone is accomplished in a plurality of sequential selective oxidation and cooling steps.

4. A process as claimed in claim 1 wherein the combustible material to be treated is a mixture of coke particles containing a small amount of coke dust.

References Cited by the Examiner

UNITED STATES PATENTS

| 1,789,380 | 1/31 | Edwards et al. | 23—209.9 X |
| 1,982,821 | 12/34 | Marsden et al. | 23—209.9 X |
| 2,342,862 | 2/44 | Hemminger. | |
| 2,515,725 | 7/50 | McLemore | 134—19 X |
| 2,721,169 | 10/55 | Mason et al. | 202—31 |
| 2,998,354 | 8/61 | Brown et al. | 202—31 |

MORRIS O. WOLK, *Primary Examiner.*